Inventor
Wilbur G. Anderson, Jr.
By Frank E. Liverance, Jr.
Attorney

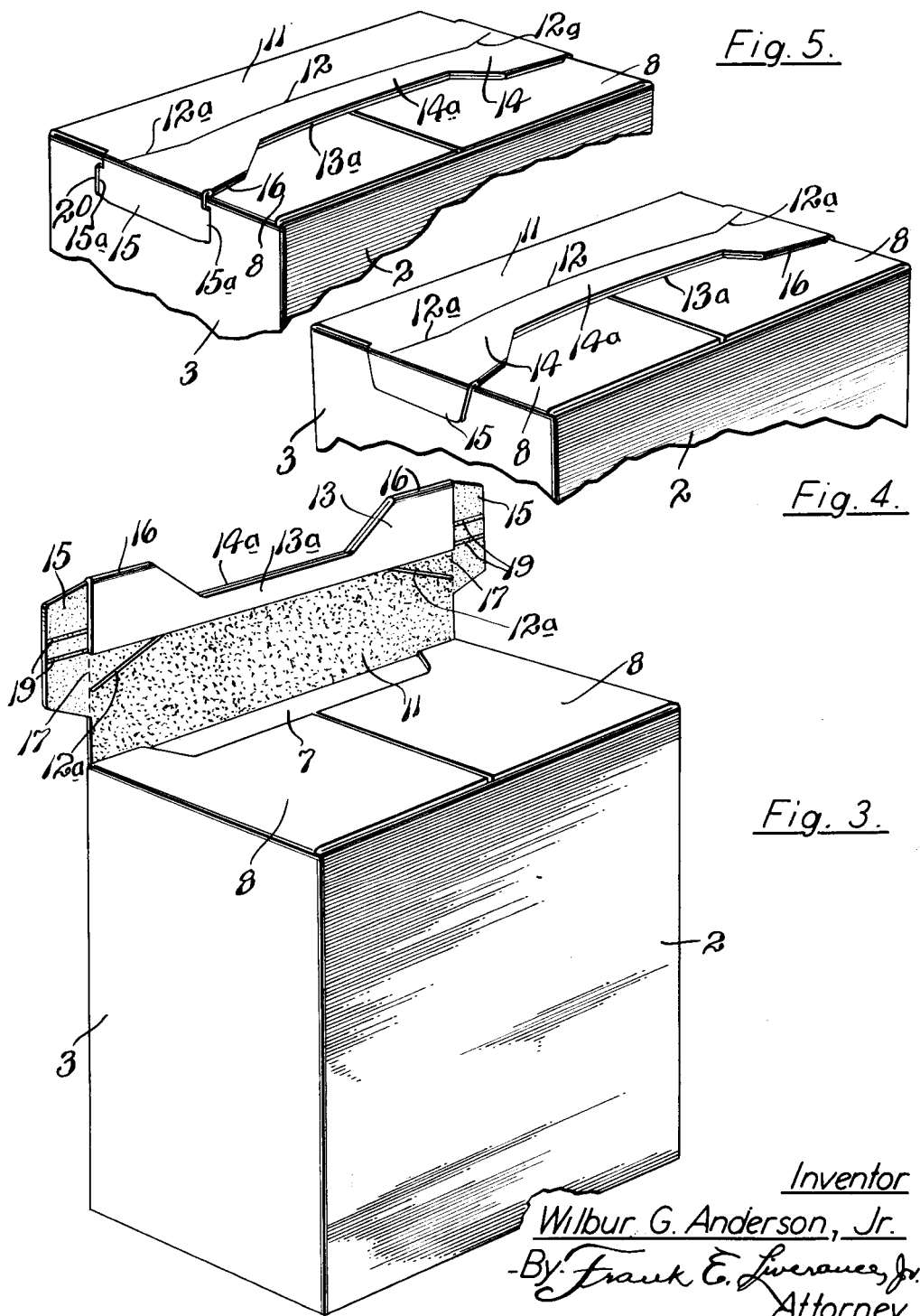

Jan. 13, 1959 W. G. ANDERSON, JR 2,868,433
HANDLE RECEPTACLE
Filed May 3, 1956 3 Sheets-Sheet 3

Inventor
Wilbur G. Anderson, Jr.
Frank E. Liverance, Jr.
Attorney

United States Patent Office 2,868,433
Patented Jan. 13, 1959

2,868,433

HANDLE RECEPTACLE

Wilbur G. Anderson, Jr., Grand Rapids, Mich., assignor to American Box Board Company, Grand Rapids, Mich., a corporation of Michigan Application May 3, 1956, Serial No. 582,507

6 Claims. (Cl. 229—52)

This invention relates to a novel, practical, sturdy, and dependable handle equipped receptacle, made preferably from paper stock which receptacle has a closed upper end with a handle integral therewith which is used to conveniently carry the receptacle and its contents. It is an object and purpose of the present invention to provide such receptacle equipped with a handle, readily and economically provided as a part of the paperboard blank from which the receptacle is made, and which is strengthened and reinforced so that contents of a considerable weight may fill the receptacle and the handle sustain such weight without damage.

It is a further object and purpose of the present invention to provide such handle equipped receptacle, which in one form will sustain relatively heavy weights, but in another form where the weight of the contents of the receptacle is small, such receptacle can be readily closed and opened, the first form of the receptacle in which the weight of the contents is heavy not being readily opened but strongly and securely sealed against normal opening and closing, so that when it is opened the receptacle is substantially useless for further service. In the second form, in which the receptacle may be opened and closed repeatedly, such substantial destruction of the receptacle for further use does not take place.

The invention may be understood from the following description, taken in connection with the accompanying drawings, in which, Fig. 1 is a plan of a blank from which the receptacle is made in the form in which the receptacle is used for carrying contents of heavy weight.

Fig. 3 is a perspective view made from the blank shown in Fig. 1 showing the parts in the relation which they have immediately prior to closing and sealing.

Fig. 4 is a perspective view of the upper end of the receptacle shown in Fig. 3 after it has been closed and sealed.

Fig. 5 is a perspective view similar to Fig. 4 of the receptacle in the form made from the blank shown in Fig. 2.

Like reference characters refer to like parts in the different figures of the drawings.

Figure 1:
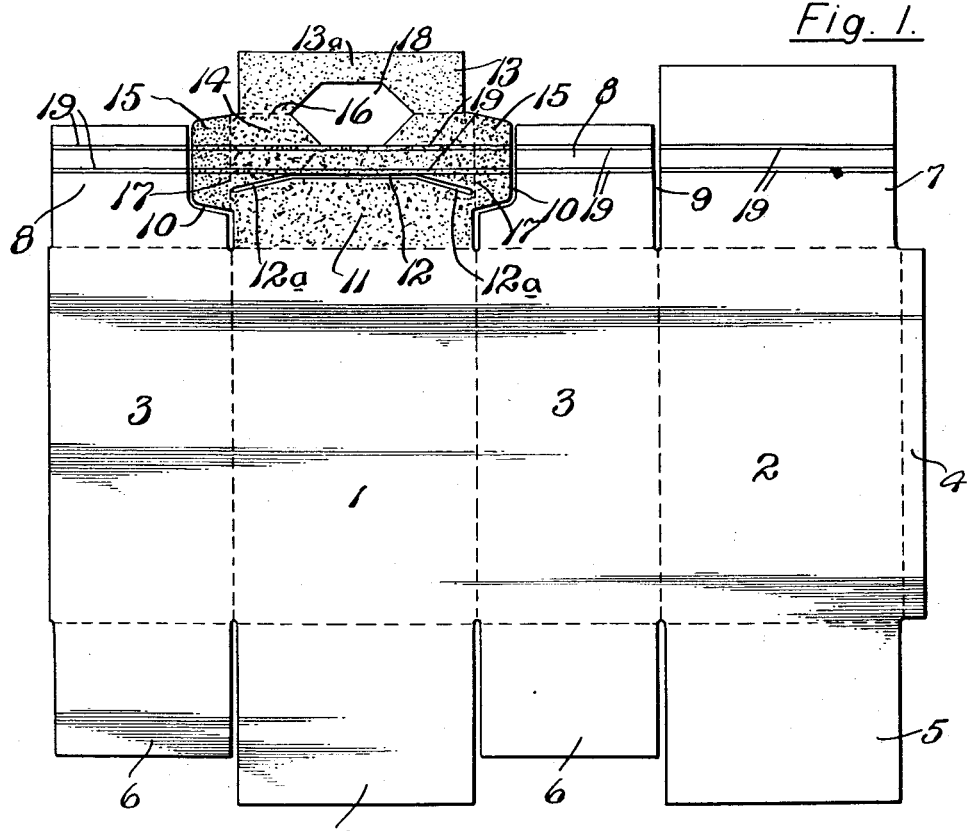

In practice the receptacle is made from paper board stock of the desired thickness and strength, and will include four sides in a continuous zone providing a front 1 and an opposite rear side 2 of equal areas, and other sides 3 spaced from and opposite to each other, the receptacle having the four vertical sides providing a rectangular cross section. Such sides 1, 2, and 3 at adjacent edges are integrally connected and scored for bending. A narrow longitudinal flange 4 integral with the outer edge of the back 2 in the blank shown in Fig. 1 is cemented to the outermost side 3 when the receptacle is in its rectangular form as in Fig. 3.

From the lower ends of the front and rear 1 and 2, lower end closure flaps 5 extend and at the lower ends of the remaining sides 3 similar closure flaps 6 are provided, the flaps 5 and 6 being disconnected from each other at adjacent edges by narrow slot separations as shown in Fig. 1. From the upper end of the rear side 2 an upper closure flap 7 extends, similar to the lower closure flap 5, and from each of the sides 3 at the upper ends thereof upper closure flaps 8 extend. The upper end closure flap 8 adjacent the flap 7 is separated therefrom by a straight slot 9. The upper end flaps 8 are separated from an end closure at the upper end of the front 1 by slots 10 which are not straight slots like the slot 9, but are of the irregular shape shown.

A closure flap which contains in its structure the novel handle of my invention, located at the upper end of the front side 1 of the box has an inner transverse section 11 integrally connected to the front 1. It is below a transverse cut 12. Such cut at its intermediate portion parallels the folding line shown as a dash line, between the inner section 11 and the front side 1. The slit or cut 12, preferably at its ends, has anguarly disposed branches 12a at an obtuse angle to the length of the slit or cut 12 as shown in Fig. 1.

The outer end of the handle end closure member has a generally rectangular section 13 between which and and the inner section 11 is an intermediate section 14. At each end of the intermediate section 14 ears 15 extend outwardly as shown. The slots 10 provide the boundaries for the outer ends and the lower sides of such ears 15 and for the outer ends of the inner section 11. A horizontal folding line at 16 is at the juncture of the outer and intermediate sections 13 and 14, and vertical folding lines 17 are at the inner ends of the ears 15. An opening 18 is cut through such end closure and handle member of the form shown in Figs. 1 and 2, narrowing the outer and intermediate sections 13 and 14 between their ends and providing narrow handle members 13a and 14a in the sections 13 and 14.

Preferably, though not necessarily so, narrow reinforcing bands 19 of strong fabric, for example, nylon, are cemented across the several upper end closing flaps, the lower or innermost of such bands being in direct proximity to the slit or cut 12.

The last described upper end and handle closure flap in practice may be covered at its inner side with a suitable cementitious material, indicated in Fig. 1, by the dotted surface at which the adhesive is applied.

Such blank to provide the receptacle is folded on the vertical folding dash lines in Fig. 1 between the sides 1, 2, and 3 and the flap 4 cemented to the outer section 3. The lower closure flaps 5 and 6 are turned inwardly to close the lower end of the receptacle. This structure is common and well known.

At the upper end the flap 7 is first turned inwardly substantially closing the upper end of the receptacle. Over it the two flaps 8 are turned inwardly toward each other to horizontal position and over the flap 7 as in Fig. 3. The upper section 13 is folded against the intermediate section 14 on the folding line 16, as in Fig.

3, the two parts 13 and 14 cementing and adhering together. This brings the two narrowed portions 13a and 14a thereof together with the reinforcing members 19 between them. The closure and sealing of the receptacle is completed by turning the outer flap, as it is in Fig. 3, downwardly to horizontal position as in Fig. 4, the section 11 adhering and having a secure cemented connection with the parts of the flaps 7 and 8 which it covers. The end ears 15 are turned downwardly and cemented to the outer sides of the sides 3. Of course it is to be understood that adhesive may be applied to the under side of the flaps 8 to firmly connect them with the under flap 7 if desired; also the lower end closure flaps 5 and 6 are glued or equivalently adhesively connected together.

When thus closed and sealed, the reinforced handle portion consisting of the sections 13 and 14 with their narrowed parts 13a and 14a, glued together is free from the upper sides of the closure flaps 8, as the side of the section 13 which comes thereagainst has no adhesive thereon when turned from the position shown in Fig. 3 to that in Fig. 4. The fingers may be inserted under such narrowed portions 13 and 14a which provide a handle and such fingers extend through the widened slit or cut 12, such widening thereof occurring on lifting upwardly on the handle thus provided. With such structure a strong reinforced handle is provided which lies flat against the upper end of the closed receptacle except when the fingers are inserted underneath it for carrying. The angularly disposed slit extensions 12a are preferred to a straight continuation at the ends of the slit 12, the structure as thus made being stronger and more durable.

Figure 2:
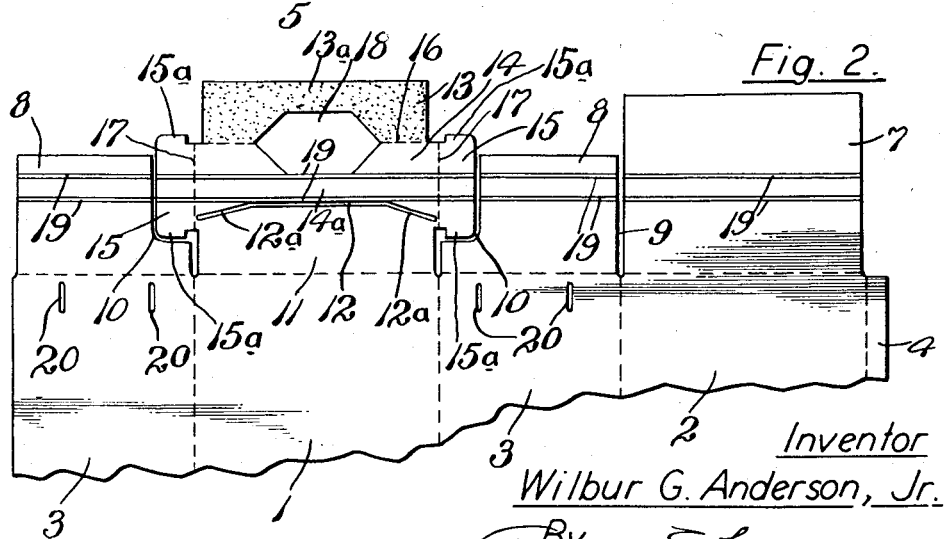
Fig. 2 is a similar fragmentary plan view of the second form of the receptacle used, in which the contents are of light weight and the receptacle may be readily opened and closed an indefinite number of times.
Figure 6:
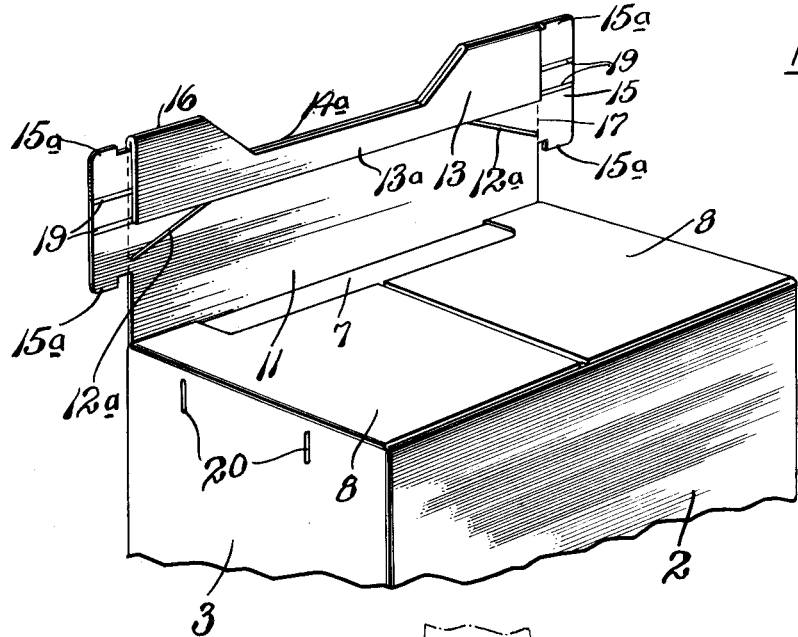
Fig. 6 is a fragmentary perspective view similar to Fig. 3 showing the receptacle of the second form immediately before closing the upper end thereof to provide the closed top illustrated in Fig. 5.
Figure 7:
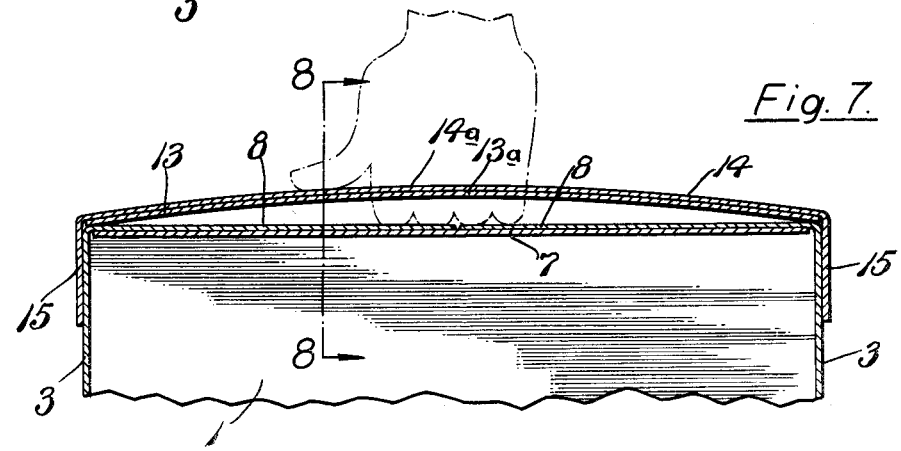
Fig. 7 is a fragmentary vertical section, substantially on the plane of line 7—7 of Fig. 8, through the handle portion lifted somewhat for the insertion of the fingers underneath.
Figure 8:
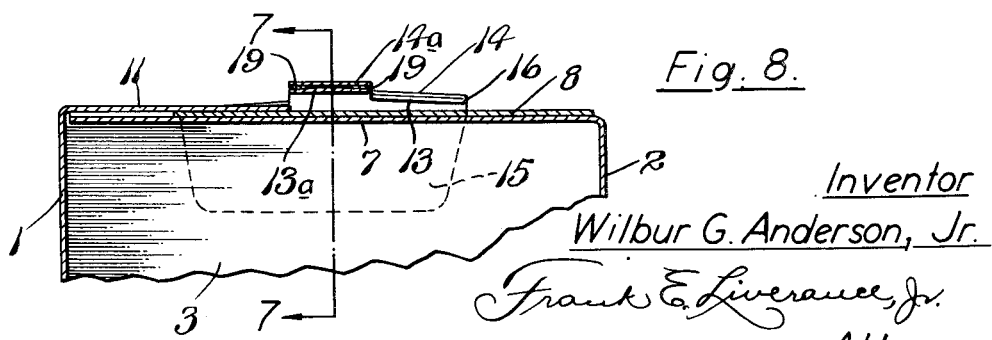
Fig. 8 is a vertical section substantially on the plane of line 8—8 of Fig. 7.

In the form made from the blank shown in Fig. 2 and which is further shown in Figs. 5 and 6, the glue or other cementitious coat is applied only to the inner side of the section 13 as shown in Fig. 2, whereby when it is folded against the intermediate section 14 on the line 16 the two parts are securely and adhesively connected. On turning the end closure down from the position shown in Fig. 6 to that in Fig. 5, the ears 15 will be turned downwardly at the outer sides of the receptacle sides 3 but not cemented thereto. Each of said flaps 15 are modified to have projecting tongues 15a at opposite side edges which may be inserted through vertical slots 20 to receive them in the sides 3 (Fig. 5). This will provide a lock of the flaps to the sides 3 and a connection thereof sufficient for the carrying of light weight articles within the receptacle. For example, a hat box may have a handle equipped upper side closure of the form and structure shown in Figs. 2, 5 and 6, which closure may be opened for removal of the contents when wanted.

With the form shown in Figs. 1, 3 and 4, after the contents have been placed in the receptacle and it has been closed and sealed by use of the adhesive as described, the opening of the sealed receptacle will substantially destroy it for further use in the same manner, while in the structure shown in Figs. 2, 5 and 6 such receptacle with its handle integral therewith may be used over and over and opened and closed indefinitely.

In the disclosure, Figs. 3, 4, 5 and 6, the flaps 8 shown outside the flap 7, may be changed to place flap 7 outside the flaps 8, without affecting the invention. Such alternate positioning of the flaps is to be preferred in many cases.

The invention is adapted to be practically used both ways. The handle as a part of the receptacle structure is very practical. There is no additional cost, the same area of paper stock being required whether or not the handle is used. With the handle reinforced by the strips 19 the contents within the receptacle may be of a considerable weight, in many cases 20 pounds or more. In general while the contents carried in the receptacle may be greatly varied and be of different kinds, it is particularly useful in connection with contents of powdered, granular, flake or similar form, the weight of which in a given volume is relatively heavy.

The invention is defined in the appended claims and is to be considered comprehensive of all forms of structure coming within their scope.

I claim:

1. A receptacle having vertical sides, closure flaps at the upper ends of all of said sides, except one thereof foldable inwardly, and an additional closure flap at the upper end of said one side foldable outside the first mentioned flaps, said last mentioned closure flap having transverse outer, intermediate, and inner sections, the inner section being integrally connected to the upper end of its associated side of the receptacle, a continuous transverse slit separating the inner and itnermediate sections, and a transverse line of folding between the outer and intermediate sections, said outer section lying against, within and having cemented connection to said intermediate section, and an ear extending outwardly from and connected with each end of said intermediate section located against opposite sides of the receptacle and connected thereto.

2. A receptacle of rectangular cross section having four vertical sides, closure flaps at the upper ends of three of said sides foldable inwardly, an additional closure flap at the upper end of the remaining side of said receptacle foldable inwardly outside the first mentioned flaps, said last mentioned flap having an outer transverse free end section folded inwardly under the intermediate transverse portion of the flap, and an ear at each end of said intermediate transverse portion of said additional closure flap overlapping and connected with opposed sides of said receptacle, said additional flap having a transverse cut therethrough providing a continuous slit in said intermediate transverse portion of said flap spaced between the connection thereof to the upper end of said remaining side of said receptacle and the folded edge of said outer transverse free end section.

3. A receptacle made of thin, paperboard stock, rectangular in cross section having vertical sides, closure flaps for the upper end of the receptacle integrally connected with the upper ends of three of said sides and foldable inwardly to horizontal position, an additional closure flap integrally connected with the upper end of the remaining side of said receptacle, foldable to horizontal position against and outside the first mentioned closure flaps, said additional flap comprising an inner transverse section cemented at its under side to the first mentioned closure flaps, an intermediate section, separated from the inner section by an elongated transverse slit, an outer free end section folded under the intermediate section and cemented thereto at the adjacent sides of said sections, and an ear at each end of said additional flap integrally connected to said inner and intermediate sections, extending downwardly at the outer sides of adjacent sides of said receptacle and cemented thereto.

4. A receptacle having a bottom closure, four vertical side walls, and closure flaps at the upper ends of each of said side walls; said closure flaps being foldable inwardly to close the upper end of said receptacle and including one thereof received over the others thereof; said one closure flap including ear portions formed from opposite side edges thereof and spaced from the free end of said one closure flap; a reinforcing member secured across said one closure flap between and inclusive of said ear portions; and means of separation provided in said one closure flap along opposite sides of said reinforcing member exclusive of said ear portions; said ear portions and reinforcing member parts thereon being engageable to opposite of said vertical side walls; and the remaining part of said reinforcing member and the part of said one closure flap to which secured forming a handle for carrying said receptacle.

5. A receptacle having a bottom closure, four vertical side walls, and closure flaps at the upper ends of each of said side walls; said closure flaps being foldable inwardly to close the upper end of said receptacle and including one thereof received over the others thereof; said one closure flap including ear portions provided on and extended beyond opposite side edges thereof; means reinforcing said one closure flap between said ear portions; and means of separation provided in said one closure flap along opposite sides of said reinforcing means; said ear portions being engageable to opposite of said vertical side walls; and said reinforcing means and the part of said one closure flap between said separation means providing a receptacle carrying handle.

6. A receptacle forming blank including portions forming a bottom closure, four vertical side walls, and closure flaps at the upper ends of each of said side walls; said closure flaps being foldable inwardly to close the upper end of said receptacle and including one thereof received over the others thereof; a reinforcing member secured across said one closure flap and extended beyond the side edges thereof; means of separation provided in said one closure flap along opposite sides of said reinforcing member; said extended parts of said reinforcing member being engageable to opposite vertical side walls of said receptacle; and the part of said reinforcing member secured to said one closure flap and the part of said closure flap between said means of separation providing a handle for carrying said receptacle.

References Cited in the file of this patent
UNITED STATES PATENTS

| | | |
|---|---|---|
| 1,941,568 | McAleer | Jan. 2, 1934 |
| 1,953,885 | McAleer | Apr. 3, 1934 |
| 2,041,021 | Quagliotti | May 19, 1936 |
| 2,115,782 | Mulnix | May 3, 1938 |
| 2,306,343 | Neubecker et al. | Dec. 22, 1942 |
| 2,693,310 | Stopper | Nov. 2, 1954 |